Figure 1:
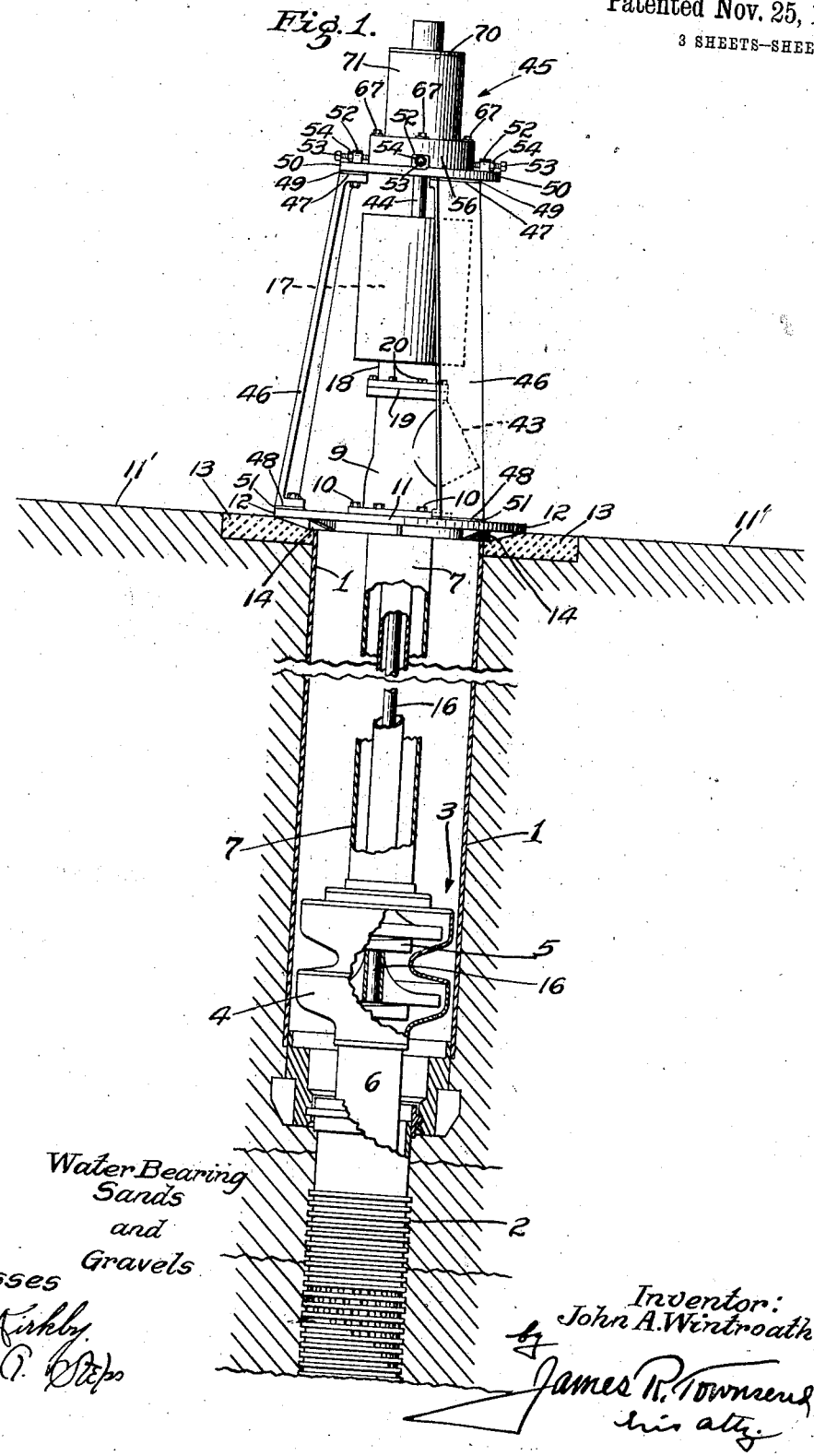

J. A. WINTROATH.
BEARING.
APPLICATION FILED FEB. 10, 1913.

1,079,680.

Patented Nov. 25, 1913
3 SHEETS—SHEET 2.

Witnesses:
W. N. Kirkby
Robert G. Stokes

Inventor:
John A. Wintroath
by James R. Townsend
his atty

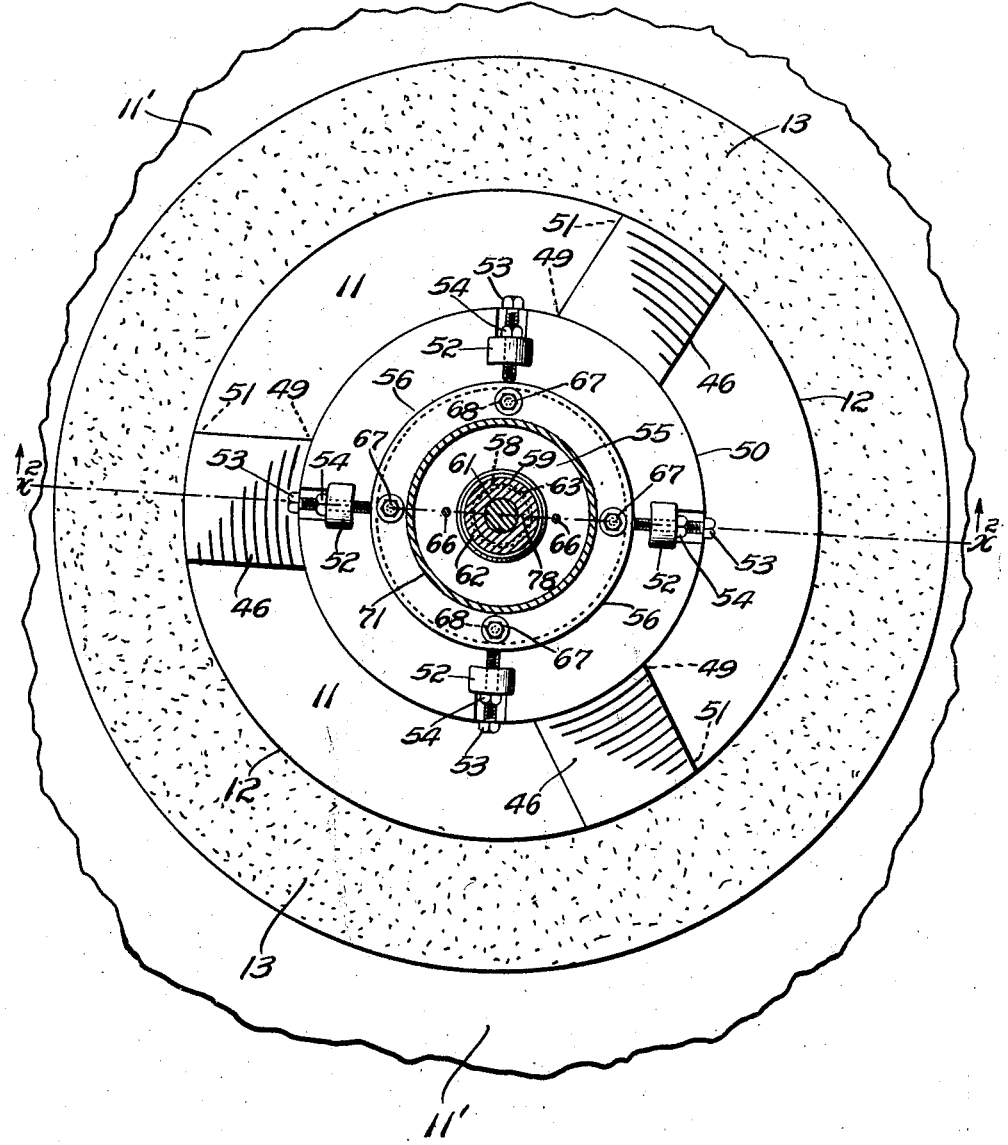

UNITED STATES PATENT OFFICE.

JOHN A. WINTROATH, OF LOS ANGELES, CALIFORNIA, ASSIGNOR TO LAYNE & BOWLER CORPORATION, OF LOS ANGELES, CALIFORNIA, A CORPORATION OF CALIFORNIA.

BEARING.

1,079,680.      Specification of Letters Patent.      Patented Nov. 25, 1913.

Application filed February 10, 1913. Serial No. 747,574.

*To all whom it may concern:*

Be it known that I, JOHN A. WINTROATH, a citizen of the United States, residing at Los Angeles, in the county of Los Angeles and State of California, have invented a new and useful Bearing, of which the following is a specification.

In modern pumping installations for wells a rotary pump is usually located beneath the surface of the earth, and the rotating parts of said pump are supported and driven by a vertical shaft extending down through the well pit. This shaft is usually supported above by a primary bearing, and a belt pulley for driving said shaft is located above said primary bearing. A second bearing, often called a top bearing, because the same is sometimes located above the primary bearing, is provided for supporting said shaft against the belt pull on the aforesaid belt pulley.

The support for the top bearing is usually independent of, or remote from, the support for the primary bearing, and these two bearings are connected by a series of elements joined to each other by machined surfaces. The nature of this connection is usually such as would require an altogether impractical degree of fine machining on the connecting elements in order to secure perfect axial alinement between the primary bearing and the top bearing if the position of the latter were unadjustable. Also the support for the top bearing rests upon a pit head which, in turn, derives its support usually by resting upon a pit casing, and by lapping over the surrounding earth onto a suitable cement foundation, as will be hereinafter described. In the country where wells of this construction are sunk it is a frequent occurrence that the soils, sands, clays, etc., into which the well mechanism penetrates, shift and settle in such fashion as to force the axis of the aforesaid shaft out of a true vertical line, and accordingly difficulty would be experienced in maintaining the top bearing in axial alinement with the shaft if said bearing were not suitably adjustable.

My invention relates to a novel practical bearing which is of general application, but which gives its most satisfactory services when used as a top bearing for well mechanism as above described.

The novel bearing has positive provision for delicate adjustment transversely of the shaft axis, so that the elements connecting same to the primary bearing need be machined with an ordinary degree of accuracy only; and the novel bearing also has provision for automatic axial alinement with the shaft so as to automatically and easily accommodate itself to the shaft as the same is forced from a true alinement by the shifting and settling of the soil and sands as previously described.

The accompanying drawings illustrate the invention.

Figure 2:
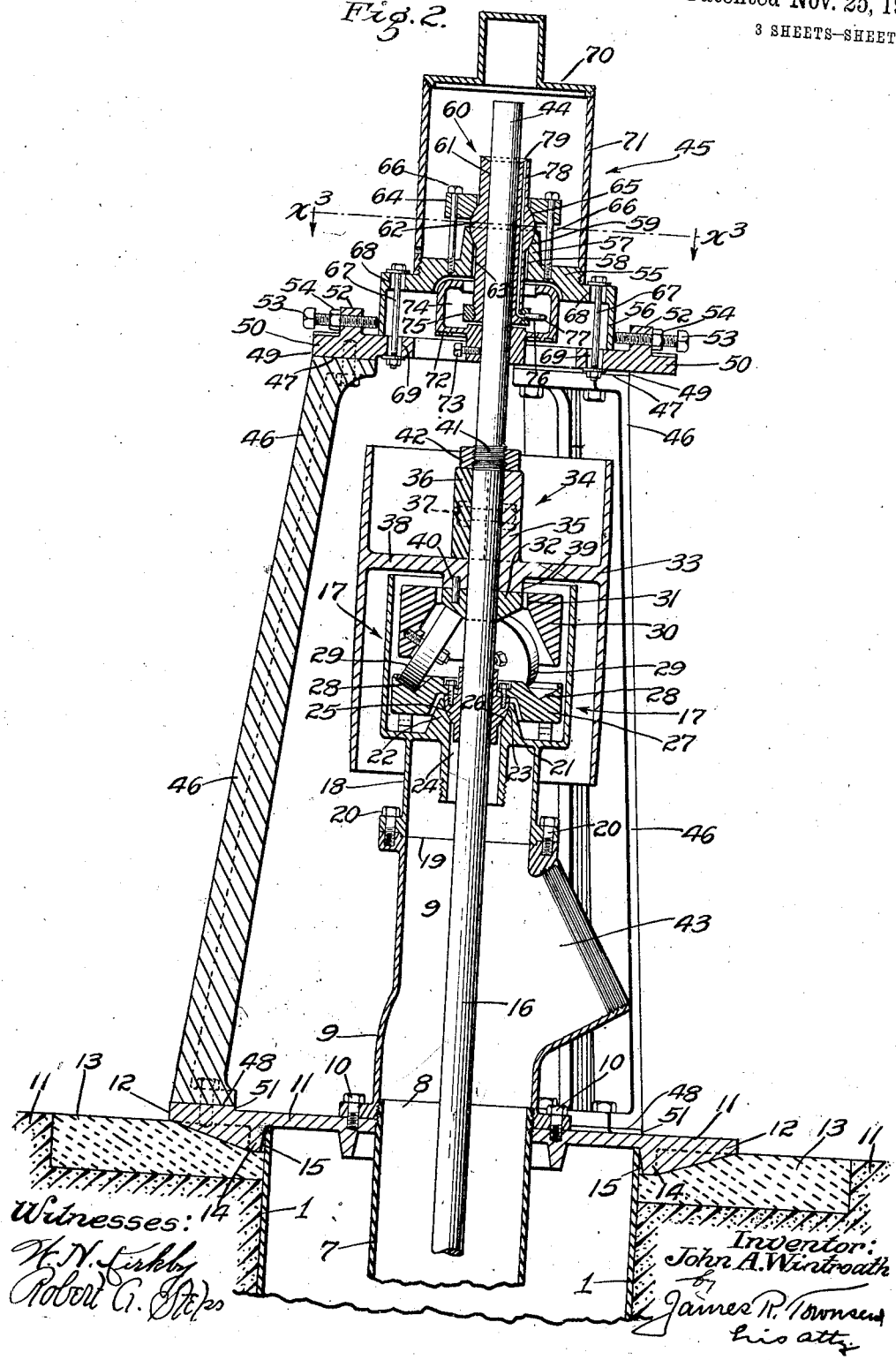

Figure 1 is a partial sectional elevation showing one form of well and pumping installation including the novel bearing embracing this invention. Fig. 2 is a large sectional elevation of the upper portion of the installation shown in Fig. 1, and displays the details of my bearing as applied to the same. Fig. 3 is a plan view of the installation as shown in Fig. 2, my bearing being shown in section along line $x^3$, Fig. 2.

In the form of well and pumping installation shown in Fig. 1, a cylindrical drum 1 termed a pit casing, is often sunk several hundred feet into the ground, and to its lower extremity is usually coupled a screened and perforated well casing 2, which extends down into the water bearing sands and gravels. A rotary pump 3 is located in said pit casing, and comprises a stationary casing 4 and a rotary impeller 5. The casing 4 is connected below to a suction pipe 6 extending down into well casing 2; and the casing 4 is connected above to a conduit 7, the upper extremity 8 of which is screwed into a discharge fitting 9, Fig. 2, whereby said conduit and casing are suspended from the discharge fitting. The bolts 10 secure the discharge fitting 9 to a pit head 11 positioned at the earth's surface 11', and which pit head rests upon the pit casing 1 and laps over, as at 12, onto a cement foundation 13. In order to center the pit head upon the pit casing and to prevent the transverse sliding of one of these members over the other, the lower face of the former is provided with an annular projection 14, the inner tapering face 15 of which is adapted to wedge down over pit casing 1.

The rotary pump impeller 5 is secured to, and supported by, a shaft 16, which extends upward through the pumping conduit 7 and which is supported above the surface of the earth in a primary bearing 17, Fig. 2. The casing 18 containing said primary bearing is provided at its lower extremity with the usual conventional and machined offset seats 19 which rest upon, and which by means of cap screws 20 are secured to similar but conversely formed offset seats on the upper face of discharge fitting 9, and by this provision accurate axial alinement between bearing casing 18 and the discharge fitting 9 is secured. A web 21 extends medially across bearing casing 18 and is formed centrally with a cylindrical upstanding lug 22 having an upper concave seat 23 and having an enlarged central aperture 24 surrounding shaft 16. A bearing or bearing member 25 is supported on the upstanding lug 22 and is provided with a convex projecting seat 26 adapted to ride in the concave seat 23. The bearing member 25 may be made of any suitable bearing material, and is provided with an internal bearing aperture which is adapted to embrace and support shaft 16 against transverse force. To the upper part of bearing member 25 is secured another member 27 having an annular wheel race 28, and a series of anti-friction wheels 29, carried by a revoluble collar 30, are adapted to rotate in the wheel race 28. The revoluble collar 30 is provided with a central aperture 31, in which the member 32 runs with shaft 16, the latter member supporting said shaft and all the weight carried by same in a manner now to be described.

The belt pulley 33 has a split hub 34, comprising the hub body 35 and the removable hub cap 36, which embraces shaft 16, and which are rigidly bound onto same by means of the hub bolts 37. The pulley hub is attached to the pulley rim by means of a web 38, and the projection 39 extending downward from said hub rests upon member 32 and is rotatively pinned to same by a pin 40. Above the pulley hub 34 the shaft 16 is threaded as at 41, and a lock-nut 42 is screwed onto the shaft threads 41 to lock said shaft onto the pulley and to transmit the weight of the shaft and part supported by same to the pulley hubs and thence to the member 32. It will be understood that a power-transmitting belt, not shown in the figures, embraces and rotates the pulley 33, shaft 16 and the pumping impellers 5 so as to draw water from the well-casing 2 through suction pipe 6 into pump casing 4, and then to force said water upward from said pump casing through conduit 7, and to discharge it through the aperture 43 of the discharge fitting 9. As member 32 rotates with the shaft the same bears upon the friction wheels 29, and all the weight carried by said shaft is transmitted through member 32 to the wheels 29 to the member 27 of the primary bearing 17.

The tension of the belt as it drives pulley 33 will be considerable, and in order to relieve primary bearing 17 from its severe side thrust, and to relieve the upper extremity of the shaft from the bending tendency occasioned by said belt tension, the upper extremity 44 of said shaft is supported in the top bearing generally referred to as 45, Fig. 2, this top bearing being supported by legs 46 as follows:—The legs 46 are machined above and below at 47 and 48, respectively, and are attached above to the machine pads 49 on a plate 50, and are attached below to the machine pads 51 of the pit head 11, the top bearing 45 being carried accordingly by the plate 50 and the legs 46. The plate 50 carries upstanding lugs 52 through which passes the adjusting screws 53 carrying lock-nuts 54. The bearing head 55 is provided with a downwardly extending flange 56 which rests against the upper or supporting face of the plate 50. Said adjusting screws bear against this flange, and said head is also provided with a cylindrical upstanding projection 57, having an enlarged cylindrical aperture 58, which aperture terminates above in the concave seat 59. The element 60 constitutes the bearing, or bearing member proper, and is formed internally with a central bearing aperture 61 into which the shaft extremity 44 fits nicely, and said bearing member is formed externally with a convex projection 62, the latter being formed conversely to the concave seat 59, and being adapted to lie in said concave seat. Below the convex projection 62 the bearing member 60 is formed with the cylindrical drum 63, the external diameter of which is smaller than the internal diameter of aperture 58 through bearing head 55.

As indicated in Fig. 3 the concave seat 59 and the convex projection 62 are complete and continuous around the axis of the shaft and are fashioned in a manner resembling a ball and socket connection, wherefrom it is clear that said bearing member may roll somewhat on the concave seat 59 so as to aline itself automatically and universally with respect to the shaft, especially when the same, for any reason, deviates from a true vertical line.

When the shaft rotates there may be a tendency for the bearing member 60 to rise off the concave seat 59, and to avoid this the cap 64 having on its lower face a concave seat 65 is fastened down onto the convex projection 62, said fastening being accomplished by means of cap screws 66, which screw into the bearing head 55, and said fastening constituting means whereby said bearing member may be secured to said bearing head. The bearing head in turn is secured to the plate 50 by means of bolts 67 passing through the enlarged apertures 68 and 69 of said bearing head and plate respectively.

In order to protect the top bearing from dust and moisture, the same is inclosed by a cover plate 70 and a casing 71 rising from the bearing head 55; and in order to reduce the friction between shaft extremity 44 and bearing member 60 a lubricating system, now to be described, is installed.

A bowl 72 surrounds the shaft, and by means of set screw 73 is locked onto said shaft, so as to rotate with the same. Lubricating oil, not shown in the figures, is supplied in the oil chamber 74 of said bowl, and as the latter rotates rapidly with the shaft, the oil near the outer periphery of said bowl will be subject to a high centrifugal pressure. From a collar 75, screwed onto the lower portion of bearing member 60, a short pipe 76 extends outward toward the region where the oil is under high centrifugal pressure. The outer extremity of said pipe is beveled off at 77, and the inner extremity communicates with the aperture 78 rising through the bearing member 60, and opening above into the concaved oil seat 79 in said bearing member. Since the bearing member 60, and consequently the projecting pipe 76, remains stationary, the oil under high centrifugal pressure will rush into the beveled pipe aperture 77 and will force itself upward through aperture 78 into the oil seat 79 formed in the upper face of bearing member 60, from which the oil will be supplied downward along shaft extremity 44 in an obvious manner.

With a top bearing as above constructed, it will be noticed that in machining pads 51 of pit head 11 and pads 49 of plate 50, and also in machining faces 47 and 48 on legs 46, it is not necessary to practise any unusual accuracy in order that the top bearing 45 may be brought into alinement with the primary bearing 17, because the bearing member 60 may be transversely adjusted or alined in any horizontal direction whatsoever with respect to said shaft by means of the adjusting screws 53, and may be secured in its adjusted position by means of the bolts 67. This transverse adjustment is delicate and may be advantageously used to ease excessive strain on the primary bearing 17 and thereby prolong the life of the latter. When said primary bearing runs hot it is merely necessary to effect a slight re-setting of the positive adjusting screws 53, whereby the aggravating and excessive strain or side thrust on the primary bearing 17 may be relieved, so that said bearing will again run easily and coolly. It will be also noticed that the adjusting screws 53 may be so operated as to always crowd bearing member 60 against the shaft extremity 44 in a direction opposite to the belt tension on said shaft, and as said crowding continues said shaft extremity will wear into the crowding side of bearing aperture 61. When the crowding side of said bearing aperture becomes worn in this wise it is merely necessary to slightly rotate said bearing member about the axis of the shaft, the concave seat 59 in the bearing head being so constructed as to permit said rotation. This will bring a new and unworn portion of the bearing aperture 61 into position where same may, in its turn, be crowded against shaft extremity 44, as before stated, until said new portion has been correspondingly worn. By successively rotating bearing member 60 as aforesaid, after the last bearing portion has been slightly worn it is clear that each and every portion of the bearing aperture 61, and consequently the whole bearing member 60, are in turn available for withstanding the crowding strain imposed on the same. By this construction, therefore, the life of the whole bearing member 60 may be used, and same is almost unlimited. It will be also noticed that the feature whereby bearing member 60 automatically alines itself universally and automatically with respect to the axis of the shaft is imperative to the successful operation of a top bearing used in connection with well pumping installation, because of the several conditions which conspire separately and collectively to force the shaft out of a vertical line. The more prominent of these conditions will now be stated.

When the drill bit bores into the earth to start the aperture into which pit casing 1 is ultimately set, the said bit often strikes a boulder or other hard spot in its path and is deflected by same away from a true vertical line. Accordingly when the pit casing 1 is set into the aperture started by said bit the pit casing, and consequently the shaft 16, will assume a position correspondingly deflected away from a true vertical line. The foundation 13 usually being level the bearing member 60 would ordinarily stand vertically, but because of its self-alining feature the same will accommodate itself to the slant of the shaft and will automatically aline itself therewith. Also, the soils, clays, gravels, etc., into which the well and pumping mechanism penetrate, frequently heave, shift or settle whereby the pit casing or the pit head move so as to throw the top bearing totally out of alinement with respect to the shaft extremity 44. On this account it is imperative that the bearing member 60 shall be automatically alinable with the axis of said shaft extremity, for otherwise the same might run hot and destroy itself before the trouble is detected. Also, because of the large discrepancies between the shaft and bearing alinement, which are sometimes caused by the aforesaid shifting of the soils, etc., it is imperative that the bearing member 60 be both adjustable transversely with respect to the shaft and be automatically alinable axially with respect to the shaft in order that said discrepancies may be adequately counteracted.

In view of the foregoing detail description it is believed that the construction, operation and utility of the novel bearing embracing the invention will be clear.

I claim:—

1. In combination, a relatively stationary horizontal plate having a supporting face, a vertical shaft, a bearing head movably supported on said supporting face, means for positively moving and adjusting said bearing head around on said supporting face, and transversely of said shaft, and a bearing member supported on said bearing head, said bearing member being adapted to support said shaft transversely, and said bearing member being adapted to universally and automatically aline itself with respect to the axis of said shaft.

2. In combination, a relatively stationary horizontal plate, a vertical shaft extending up through said plate, a bearing head slidably and adjustably mounted on said plate, adjusting screws for positively adjusting said head in any horizontal direction whatsoever, a bearing member supported on said bearing head, said bearing member being adapted to support said shaft transversely, and said bearing member being adapted to universally and automatically aline itself with respect to the axis of said shaft.

3. In combination, a relatively stationary horizontal plate having a supporting face, a vertical shaft, a bearing head supported by said face so as to be slidable on the same in any horizontal direction whatsoever, means for positively sliding said head on the said supporting face so as to adjust said head in any horizontal direction whatsoever, a bearing member carried by said bearing head, said bearing member being adapted to support said shaft transversely, and said bearing member being adapted to universally and automatically aline itself with respect to the axis of said shaft.

In testimony whereof, I have hereunto set my hand at Los Angeles, California, this twenty-first day of December 1912.

JOHN A. WINTROATH.

In presence of—
PAUL D. BOWLER.
ROBERT A. STEPS.